United States Patent [19]

Pecsi

[11] 4,104,688

[45] Aug. 1, 1978

[54] STARTER MOTOR PROTECTOR CIRCUIT

[75] Inventor: Louis E. Pecsi, Deptford, N.J.

[73] Assignee: Eaton Corporation, Cleveland, Ohio

[21] Appl. No.: 750,298

[22] Filed: Dec. 13, 1976

[51] Int. Cl.[2] ............................................ H02H 7/00

[52] U.S. Cl. ............................ 361/28; 123/179 BG; 307/10 R

[58] Field of Search ...................... 361/28, 29, 33, 23, 361/196, 205; 123/179 A, 179 B, 179 BG; 290/37 A; 307/10 R

[56] References Cited

U.S. PATENT DOCUMENTS

| | | | |
|---|---|---|---|
| 3,593,697 | 7/1971 | Ciolli | 123/179 BG |
| 3,681,658 | 8/1972 | Naoi et al. | 361/33 |
| 3,857,043 | 12/1974 | Habasch | 123/179 BG X |
| 3,885,543 | 5/1975 | Swartz | 123/179 B |
| 4,006,723 | 2/1977 | Schmidli | 123/179 B |

*Primary Examiner*—Patrick R. Salce
*Attorney, Agent, or Firm*—R. J. McCloskey

[57] ABSTRACT

A circuit for preventing the energization of the starter motor for an internal combustion engine while the engine is running. A first SCR energizes the starter relay, and also a second SCR. Circuitry is provided to maintain the second SCR energized as long as the engine is running and to prevent the first SCR from being reenergized as long as the second SCR is energized. According to one aspect of the invention time delay means is provided to insure that all rotating parts can come to a stop before the starter motor can be reenergized.

6 Claims, 1 Drawing Figure

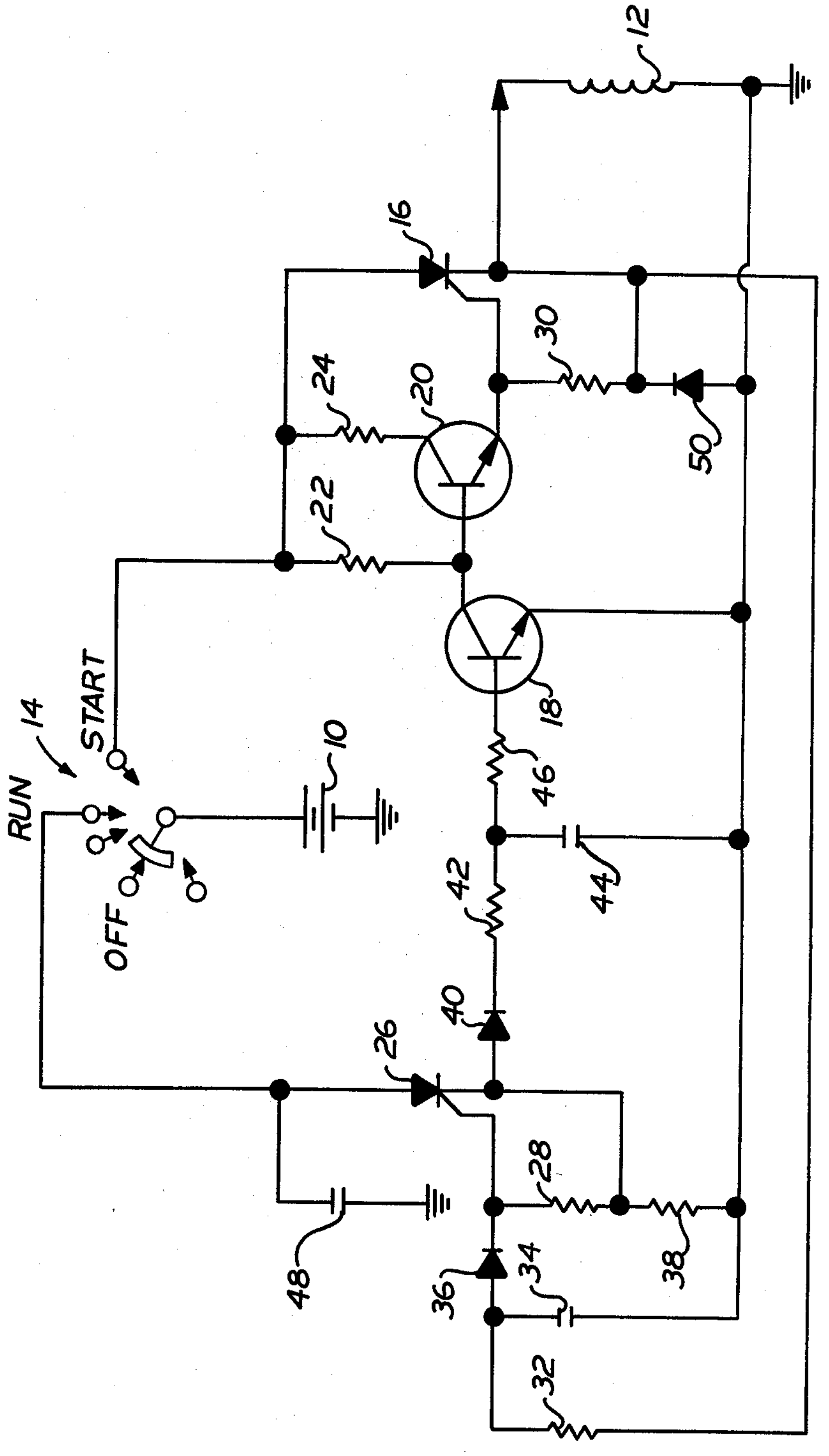
RUN
14
START
OFF
10
12
16
20
24
22
30
50
18
46
42
44
40
26
28
38
48
36
34
32

STARTER MOTOR PROTECTOR CIRCUIT

The present invention relates to internal combustion engine powered industrial trucks, and more particularly to a circuit for protecting the starter motor of such trucks.

Industrial trucks are subjected to numerous stops and starts during the course of a normal work shift. Internal combustion (I.C.) engine trucks are generally not left running when unattended, and can include systems which automatically shut down the engine when the operator leaves his station.

In an I.C. engine driven truck the engine starting system is subject to a good deal more wear and tear than is the case in the more familiar automotive system. As a result every effort must be made to prolong the life of each component of the system. Because of the number of starts the system is subjected to, and because of the high level of activity involved in the operation of an industrial truck, it is very easy to inadvertently engage the starter when the engine is already running.

Systems for preventing inadvertent operation of the starting system of an I.C. engine are generally known in the art; however, these involve either mechanical interlocks or are dependent on other components of the engine and drive train. One known prior art system is disclosed in U.S. Pat. No. 3,681,658, in which the ability to actuate the starter system is dependent on the generator output voltage.

What the present invention seeks to provide is a purely electrical system for preventing inadvertent starter operation, which is not dependent on other mechanical or electrical components for its operation.

Accordingly, it is an object of the invention to provide a protective circuit which will prevent operation of the starter motor of an internal combustion engine when the engine is running.

Another object of the invention is to provide such a system in the form of a simple electronic circuit.

Another object of the invention is to provide such a system, which is not dependent for its operation on other components of the engine and/or drive train.

To meet the above objectives, the present invention provides a circuit in which the starter relay is energized by a silicon controlled rectifier (SCR). When the engine starts and the ignition switch is moved from a START position to a RUN position a second SCR maintains a charge on a capacitor, which through appropriate transistor circuitry keeps the first SCR from being turned on again until the ignition switch is moved through its OFF position.

According to another aspect of the invention a time delay is provided, which insures that the engine and starter have stopped rotating before a restart can be effected.

Other objects and advantages of the invention will become more apparent from the following description when taken in connection with the accompanying drawing, which is a schematic diagram of the starter motor protector circuit of the invention.

Referring to the drawing, the present invention is illustrated schematically in the electrical system for an internal combustion engine using an electric starter. A storage battery 10 supplies current to a starter motor circuit represented by a starter relay 12, and to an ignition or run circuit (not shown). It should be understood that the term ignition circuit as used herein is intended to designate any circuit enabling the engine to run on its own, and can be a spark ignition circuit for a gasoline or LP gas engine, or another enabling circuit for a compression ignition or turbine engine. The starter relay and ignition circuits are controlled by a switch 14, which can be the familiar form of key switch used in most automobiles, and having a spring loaded start position.

When the switch 14 is turned to the START position, the storage battery 10 is connected to both the RUN and START terminals causing voltage to be applied to the collector of transistor 18 and to the base of transistor 20 through a resistor 22. Voltage is also applied to the collector of transistor 20 through a resistor 24, and to the anode of SCR 16 and the anode of a second SCR 26. At this point, transistor 18 is not conducting due to the absence of base voltage, while transistor 20 is conducting. (Resistors 28 and 30 are provided to prevent SCRs 26 and 16, respectively, from turning on prematurely due to external noise.) A gate signal is provided to SCR 16 through the emitter of transistor 20, turning on SCR 16 and energizing the starter relay 12. The output of SCR 16 is also applied through a network including a resistor 32, a capacitor 34 and a diode 36, to the gate of SCR 26, turning SCR 26 on. Resistor 32 and capacitor 34 provide a time delay circuit preventing SCR 26 from turning on before SCR 16 turns on. Diode 36 blocks current flow to the starter relay 12 when SCR 16 is turned off.

With SCR 26 on, a voltage drop occurs across resistor 38 causing current flow through diode 40 and resistor 42 resulting in the charging of a capacitor 44. Capacitor 44 applies a voltage to the base of transistor 18 through a resistor 46, turning transistor 18 on. When transistor 18 turns on, the base voltage for transistor 20 falls, turning transistor 20 off and removing the gate signals from SCR 16 and SCR 26.

When the engine starts the switch 14 is returned to the RUN position disconnecting the battery 10 from the anode of SCR 16, thus extinguishing SCR 16 but maintaining battery voltage at the anode of SCR 26, thus maintaining SCR 26 on, which results in capacitor 44 remaining charged.

If a restart of the engine is attempted by turning switch 14 to the START position, transistor 18 will immediately conduct since SCR 26 is conducting causing a voltage to be applied to the base of transistor 18. When transistor 18 turns on, the base voltage to transistor 20 falls, insuring that transistor 20 will not turn on, thus preventing a gate signal from being applied to SCR 16. Because of the absence of a gate signal, SCR 16 can not conduct and thus starter relay 12 cannot be energized.

In order to restart the engine the switch 14 must be returned to the OFF position. This removes the anode voltage from SCR 26, shutting it off. AT this point transistor 18 will remain on as capacitor 44 discharges through resistor 46. When the switch 14 is turned to the START position, SCR 16 will not turn on to energize starter relay 12 until capacitor 44 discharges to a point that allows transistor 18 to turn off, thus allowing transistor 20 to turn on to apply a gate signal to SCR 16. The time delay effected by the discharge of capacitor 44 is proportional to the product of the values of resistor 46 and capacitor 44. Such time delay is preferred since it can provide sufficient time for the rotating parts of the starter system to come to a complete stop before the starter relay can be re-energized. Once transistor 18 turns off, it will not turn on again until SCR 16 turns on, allowing a gate voltage to be applied to SCR 26.

Capacitor 48 can be connected to the anode of SCR 26 to act as a filter in case of a worn switch 14 or contact bounce within the switch. A diode 50 can be provided across the starter relay 12 to protect SCR 16 against voltage transients which can occur when the field collapses in the starter relay coil.

I claim:

1. A circuit for preventing energization of a starter motor for an internal combustion engine when the internal combustion engine is running comprising:

a power supply;

a starter relay for energizing the starter motor;

control means establishing an engine start signal and an engine run signal;

first switching means actuated by a control signal applied thereto in response to said start signal for connecting said power supply to said starter relay to energize said starter relay;

second switching means actuated by a control signal applied thereto in response to said run signal and energization of said starter relay to prohibit said first switching means from being responsive to said start signal as long as said run signal is applied to said second switching means;

said control means having a first position connecting said power supply to said first switching means causing said engine start signal to be applied to said first switching means, a second position disconnecting said power supply from said first switching means while maintaining a connection between said power supply and said second switching means causing said run signal to be applied to said second switching means and insuring the continued actuation of said second switching means after said first switching means has been extinguished, and a third position disconnecting said power supply from said first and second switching means causing said second switching means to be extinguished permitting said first switching means to be reactuated when said control means is subsequently placed in said first position; and circuitry for providing a first time delay preventing the actuation of said second switching means in response to said run signal and energization of said starter relay until said first time delay has expired.

2. Apparatus as claimed in claim 1, further including circuitry for providing a second time delay operable when said control means is placed in said third position, said second time delay causing said second switching means to remain actuated preventing said first switching means from being actuated until said second time delay has expired.

3. Apparatus as claimed in claim 2, wherein said first and second switching means are silicon controlled rectifiers.

4. A circuit for preventing energization of a starter motor for an internal combustion engine when the internal combustion engine is running comprising:

a power supply;

a starter relay for energizing the starter motor;

control means for establishing an engine start signal and an engine run signal, said control means being capable to simultaneously establish said start and run signals and to establish said run signal without the establishment of said start signal;

first switching means actuated by a control signal applied thereto in response to said start signal, said first switching means, when actuated, connecting said power supply to said starter relay to energize said starter relay;

second switching means actuated by a control signal applied thereto in response to said run signal and energization of said starter relay, said second switching means, when actuated, prohibiting said first switching means from being responsive to said start signal as long as said run signal is applied to said second switching means, and circuitry for providing a first time delay preventing the actuation of said second switching means in response to said run signal and energization of said starter relay until said first time delay has expired.

5. Apparatus as claimed in claim 4 wherein said control means further includes means for preventing the establishment of said start and run signals allowing said first switching means to be reactuated.

6. Apparatus as claimed in claim 5, further including circuitry for providing a second time delay operable when said means for preventing the establishment of said start and run signals is actuated, said second time delay causing said second switching means to remain actuated preventing said first switching means from being actuated until said second time delay has expired.

* * * * *